(12) United States Patent
Kameda

(10) Patent No.: US 10,804,780 B2
(45) Date of Patent: Oct. 13, 2020

(54) HOLLOW SINGLE-PHASE INDUCTION MOTOR

(71) Applicant: NITTAN VALVE CO., LTD., Hadano-shi, Kanagawa (JP)

(72) Inventor: Michihiro Kameda, Ota (JP)

(73) Assignee: NITTAN VALVE CO., LTD., Hadano-shi Kanagawa (JP)

( * ) Notice: Subject to any disclaimer, the term of this patent is extended or adjusted under 35 U.S.C. 154(b) by 160 days.

(21) Appl. No.: 16/124,214

(22) Filed: Sep. 7, 2018

(65) Prior Publication Data

US 2019/0081541 A1 Mar. 14, 2019

Related U.S. Application Data

(63) Continuation-in-part of application No. PCT/JP2016/057432, filed on Mar. 9, 2016.

(51) Int. Cl.
*H02K 17/04* (2006.01)
*H02K 3/04* (2006.01)
(Continued)

(52) U.S. Cl.
CPC ............ *H02K 17/04* (2013.01); *H02K 1/145* (2013.01); *H02K 3/04* (2013.01); *H02K 3/22* (2013.01);
(Continued)

(58) Field of Classification Search
CPC ............ H02K 1/17; H02K 3/47; H02K 17/12
(Continued)

(56) References Cited

U.S. PATENT DOCUMENTS 3,261,998 A * 7/1966 Bosco, Jr. .............. H02K 19/24
310/126
3,330,975 A * 7/1967 Osterwalder ........ H02K 21/125
310/164
(Continued)

FOREIGN PATENT DOCUMENTS

| JP | H5-328646 A | 12/1992 |
| JP | 2015-154555 A | 8/2015 |
| WO | 2010-035318 A1 | 4/2010 |

OTHER PUBLICATIONS

International Preliminary Report on Patentability dated Sep. 11, 2018 in PCT/JP2016/057432 which published as WO/2017/154147 A1 on Sep. 14, 2017 and which is the International Application of which the present application is a continuation-in-part. Submitted in lieu of translation for Foreign Patent Documents Cite Nos. 2 and 3.

*Primary Examiner* — Jose A Gonzalez Quinones
(74) *Attorney, Agent, or Firm* — JTT Patent Services, LLC; Gerald T. Peters

(57) ABSTRACT

A hollow low-current single-phase induction motor capable of starting under its own power may have a stator and a rotor. The stator may comprise a case and a winding. The case may have a base, an annular outer circumferential wall, an annular inner circumferential wall, a plurality of first extensions formed at the outer circumferential wall, and a plurality of second extensions formed at the inner circumferential wall so as to respectively face the first extensions. The rotor may have a flange, a plurality of coil supports formed along the outside circumference of the flange, and a plurality of annular rotor coils which are attached to the respective coil supports. The coil supports may be inserted between the first extensions and the second extensions such that at least one thereamong is misaligned in the circumferential direction relative to the first extensions and the second extensions.

4 Claims, 4 Drawing Sheets

(51) Int. Cl.
*H02K 1/14* (2006.01)
*H02K 3/22* (2006.01)
*H02K 16/04* (2006.01)
*H02K 19/04* (2006.01)
*H02K 7/08* (2006.01)
*H02K 17/16* (2006.01)

(52) U.S. Cl.
CPC ............ *H02K 7/085* (2013.01); *H02K 16/04* (2013.01); *H02K 17/16* (2013.01); *H02K 19/04* (2013.01)

(58) Field of Classification Search
USPC .................... 310/67 R, 254.1, 263, 265–266
See application file for complete search history.

(56) References Cited

U.S. PATENT DOCUMENTS

| | | | | |
|---|---|---|---|---|
| 3,459,982 A * | 8/1969 | Cartier | ................ | H02K 23/40 310/164 |
| 4,080,724 A * | 3/1978 | Gillette | ................ | H02K 1/06 29/596 |
| 4,731,554 A * | 3/1988 | Hall | ................ | H02K 29/08 310/156.26 |
| 4,763,050 A * | 8/1988 | Ruppert | ................ | H02K 29/08 318/400.41 |
| 4,837,474 A * | 6/1989 | Petersen | ................ | H02K 21/12 310/156.12 |
| 4,949,000 A * | 8/1990 | Petersen | ................ | G11B 19/2009 29/596 |
| 5,177,392 A * | 1/1993 | Scott | ................ | H02K 1/02 310/268 |
| 5,854,526 A * | 12/1998 | Sakamoto | ................ | H02K 1/14 310/216.066 |
| 6,097,124 A * | 8/2000 | Rao | ................ | H02K 21/046 310/156.48 |
| 6,459,184 B1 * | 10/2002 | Ozeki | ................ | A63B 21/0052 118/267 |
| 6,465,916 B1 * | 10/2002 | Aoshima | ................ | G08B 6/00 310/156.02 |
| 6,700,271 B2 * | 3/2004 | Detela | ................ | H02K 7/088 310/164 |
| 6,747,385 B2 * | 6/2004 | Huang | ................ | H02K 1/145 310/216.069 |
| 6,891,302 B1 * | 5/2005 | Gabrys | ................ | F16C 39/063 310/178 |
| 8,772,998 B2 * | 7/2014 | Maximov | ................ | H02K 1/148 310/216.021 |
| 2003/0201686 A1 * | 10/2003 | Narita | ................ | H02K 17/16 310/211 |
| 2005/0285474 A1 * | 12/2005 | Kaneko | ................ | H02K 29/03 310/266 |
| 2016/0065024 A1 * | 3/2016 | Zhang | ................ | H02K 3/345 310/215 |
| 2016/0164386 A1 * | 6/2016 | Kusase | ................ | H02K 1/276 310/156.01 |

* cited by examiner

HOLLOW SINGLE-PHASE INDUCTION MOTOR

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2016/057432, entitled "Hollow Single-Phase Induction Motor", filed 9 Mar. 2016, the content of which is incorporated herein in its entirety by reference.

FIELD OF THE INVENTION

The present invention relates to a single-phase induction motor; more specifically, the present invention relates to a hollow induction motor capable of starting under its own power through use of low-intensity single-phase alternating electric current.

BACKGROUND

A single-phase induction motor having a structure in which winding(s) are arranged in diametrically opposed orientation across the outer shell of the motor will in general be incapable of starting under its own power despite the fact that electromagnetic forces of diametrically opposed orientation are produced when alternating electric current is made to flow through the winding(s).

One type of motor that is capable of starting under its own power is a three-phase induction motor in which three sets of windings arranged in diametrically opposed orientations across the outer shell of the motor are arranged with uniform spacing in the circumferential direction, three-phase electric current being made to flow therethrough so that the squirrel-cage rotor arranged inside the windings is made to rotate due to the rotating magnetic field that is produced thereby.

A squirrel-cage rotor in the context of such a three-phase induction motor might, for example, be constituted from a plurality of linear laminar conductive bodies; an annular conductive connector which electrically connects one end of all of the laminar conductive bodies; and a plurality of (e.g., six) arcuate conductive connectors forming a plurality of (e.g., six) groups of linear conductive bodies as a result of electrical connection of the other ends of the linear laminar conductive bodies in multiple sets (e.g., sets of five) thereof.

But one problem with such a three-phase induction motor is that wiring of winding(s) and control of current flowing therethrough tends to be more complicated than is the case with single-phase induction motors.

Furthermore, a three-phase induction motor having a squirrel-cage rotor as described above might typically produce a rotating magnetic field as a result of employment of lines of magnetic force that pass through the center of rotation of the squirrel-cage rotor. This being the case, where it is therefore thought desirable to provide such a squirrel-cage rotor at the outside circumference of a solid iron core so as to facilitate passage of lines of magnetic force through the aforementioned center of rotation, this will preclude the motor from being made in the form of a hollow structure.

Moreover, where it is thought desirable for a three-phase induction motor to be a low-voltage motor permitting attainment of rotation with little electric current, one way that this might be achieved is by causing electrically conductive paths that produce induced electric current to be made short as a result of dividing conductive connectors, e.g., the arcuate conductive conductors in the example given above, into a plurality of (e.g., six) more or less equal parts, thus reducing the resistance of each of the electrically conductive paths.

However, in the context of a low-voltage three-phase induction motor having a squirrel-cage rotor of the type described above, to obtain the force necessary to cause rotation of the squirrel-cage rotor, electric current might, for example, be required to flow simultaneously through on the order of ten or more laminar linear conductive bodies as well as the arcuate conductive connectors. From the standpoints of lowering resistance and making it possible for the rotor to rotate with even less electric current, it would be desirable for length of the electrically conductive path (e.g., total length of the ten or more laminar linear conductive bodies plus that of the arcuate conductive connectors in the example given above) to be made as short as possible.

There is therefore a need for a single-phase induction motor that is capable of starting under its own power. It would further be desirable if this could be accomplished using low-intensity single-phase alternating electric current. It would also be desirable if such a single-phase induction motor could be made capable of having a hollow construction in which an iron core need not be present at the rotor center.

SUMMARY OF INVENTION

To address one or more of the needs described above, one embodiment of the present invention is a hollow induction motor capable of starting under its own power through use of low-intensity single-phase alternating electric current.

In the context of an induction motor having a stator made of metal causing a plurality of magnetic poles to be formed through use of an alternating current power source, and a rotor which is arranged coaxially with respect to the stator and which rotates in accordance with changes in the magnetic poles at the stator, a hollow single-phase induction motor in accordance with one embodiment might be constituted such that the stator has an annular case having a base, an annular outer circumferential wall which protrudes in a perpendicular direction from the base, an annular inner circumferential wall which protrudes from the base so as to be located inside the outer circumferential wall and coaxial with respect to the outer circumferential wall, a plurality of first extensions formed at spaced intervals along a circumferential direction of a rim of the outer circumferential wall, and a plurality of second extensions formed at spaced intervals along the circumferential direction of a rim of the inner circumferential wall in such fashion as to respectively face the first extensions; and a winding which is secured to an inside of the case and which forms mutually different magnetic poles at the first extensions and the second extensions when alternating single-phase electric current is made to flow therethrough; and the rotor has a cylindrical main body which is rotatably and coaxially supported by the inside of the case, a flange formed so as to protrude from an outside circumferential surface of the main body, a plurality of coil supports formed at spaced intervals along the circumferential direction of an outer rim of the flange, which are inserted in gaps formed between the first extensions and the second extensions in such fashion that the respective tips thereof are parallel to both the first extensions and the second extensions, and which are such that at least one thereamong is arranged so as to be misaligned in the circumferential direction of the case relative to both the first extensions and the second extensions, and a plurality of annular rotor coils which are respectively attached to outside circumferential surfaces of the respective coil supports.

In accordance with such an embodiment, causing alternating single-phase electric current to flow through winding(s) causes mutually different magnetic poles (N poles and S poles) to be produced in alternating fashion at a plurality of first extensions which are provided at an outer circumferential wall of an annular case and second extensions which are provided at an inner circumferential wall and which respectively face the first extensions. At such time, electromagnetic induction causes electric current to flow in the circumferential direction at rotor coil(s) at coil support(s) which are inserted in gap(s) at first extension(s) and second extension(s) and which are arranged so as to be misaligned in the circumferential direction of the case relative to first extension(s) and second extension(s); and, at front and back ends, repelling magnetic poles are produced at both the first extension(s) and the second extension(s), or attracting magnetic poles are produced at both thereof. At such time, a rotor having a plurality of rotor coils will be made to rotate due to the rotational torque which results from the electromagnetic forces produced at the respective rotor coils in accordance with Fleming's left hand rule.

Where this is the case, the rotor will start to move under its own power due to the single-phase alternating electric current which flows through the winding(s). Furthermore, due to the fact that length(s) of each of the electrically conductive paths which produce the induced electric current may be made short, being the circumference of the annular rotor coil(s), resistance of each of the electrically conductive paths in such an embodiment is reduced. Furthermore, in such an embodiment, the rotor may be made to rotate as a result of the magnetic field produced between first extensions and second extensions arranged on concentric circles, in which case lines of magnetic force that pass through the center of rotation of the rotor will not be produced.

Moreover, at the hollow single-phase induction motor in accordance with the foregoing embodiment, one of either combination of the plurality of the first extensions and the second extensions that face the first extensions, or the plurality of coil supports, may be arranged with uniform spacing in the circumferential direction of the case, and at least a portion of the other may be arranged with a different spacing in the circumferential direction of the case.

Where this is the case, no matter where the rotor is located when it stops rotating, ends in the circumferential direction of the respective rotor coils will not all coincide with ends in the circumferential direction of the first extensions and ends in the circumferential direction of the second extensions, it always being the case that at least a portion of the plurality of rotor coils will stop at location(s) that are misaligned in the circumferential direction of the case relative to the first extensions and the second extensions.

Moreover, at the hollow single-phase induction motor in accordance with the present application, respective lengths of inside circumferential surfaces of the plurality of first extensions and respective lengths of outside circumferential surfaces of the plurality of second extensions are all formed so as to be shorter than respective widths of the rotor coils.

In accordance with such an embodiment, no matter where the rotor is located when it stops rotating, ends in the circumferential direction of the respective rotor coils will not all coincide with ends in the circumferential direction of the first extensions and ends in the circumferential direction of the second extensions, it always being the case that at least a portion of the plurality of rotor coils will stop at location(s) that are misaligned in the circumferential direction of the case relative to the first extensions and the second extensions.

Moreover, at the hollow single-phase induction motor in accordance with the foregoing embodiment, the rotor coils may be made of copper.

In accordance with such an embodiment, resistance of the rotor coils may be made low, facilitating generation of an electric field due to electromagnetic induction.

BENEFIT OF INVENTION

Some embodiments of the present invention make it possible to provide a single-phase induction motor that is capable of starting under its own power.

In accordance with some embodiments, a single-phase induction motor may be made capable of starting under its own power even where low-intensity single-phase alternating electric current is used.

In some embodiments, a single-phase induction motor is made capable of having a hollow construction in which an iron core need not be present at the rotor center.

For example, in some embodiments, because the respective rotor coils form electrically conductive paths having low resistance, a hollow single-phase induction motor in accordance with such an embodiment will permit attainment of an induction motor which is capable of starting under its own power through use of low-intensity single-phase alternating electric current. Moreover, in some embodiments, because the need for an iron core that produces lines of magnetic force which pass through the center of rotation of the rotor to be provided at the rotor center is eliminated, it is possible to obtain a hollow induction motor.

And because a hollow single-phase induction motor in accordance with some embodiments is such that it will always be the case that at least a portion of the plurality of rotor coils will be arranged at location(s) that are misaligned in the circumferential direction relative to the first extensions and the second extensions, it will be possible in such an embodiment to obtain a hollow induction motor that will always be capable of starting under its own power without there being any need to adjust the locations of the rotor coils relative to where they were when they stopped.

A hollow single-phase induction motor in accordance with the present application permits attainment of a hollow induction motor which is capable of starting under its own power through use of single-phase alternating electric current that is of even lower intensity.

BRIEF DESCRIPTION OF THE DRAWINGS

Many aspects of the invention can be better understood with reference to the attached drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Constitution and operation of an embodiment of a hollow single-phase induction motor in accordance with embodiments of the present invention will be described with reference to FIG. 1 to FIG. 4. At the drawings, Fr indicates the front of the hollow single-phase induction motor, Re indicates the back thereof, Up indicates the top thereof, and Lw indicates the bottom thereof.

Figure 1:
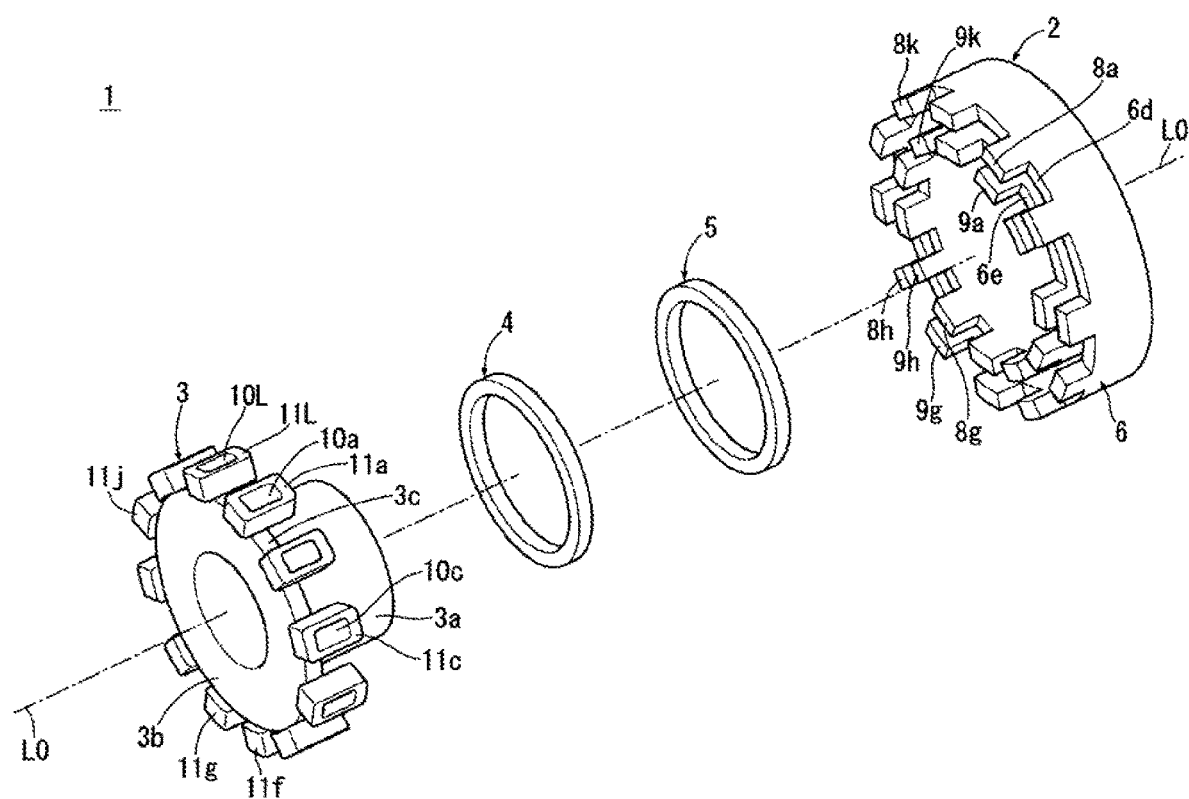
FIG. 1 is an exploded perspective view of a hollow single-phase induction motor in accordance with one embodiment of the present invention.
Figure 2:
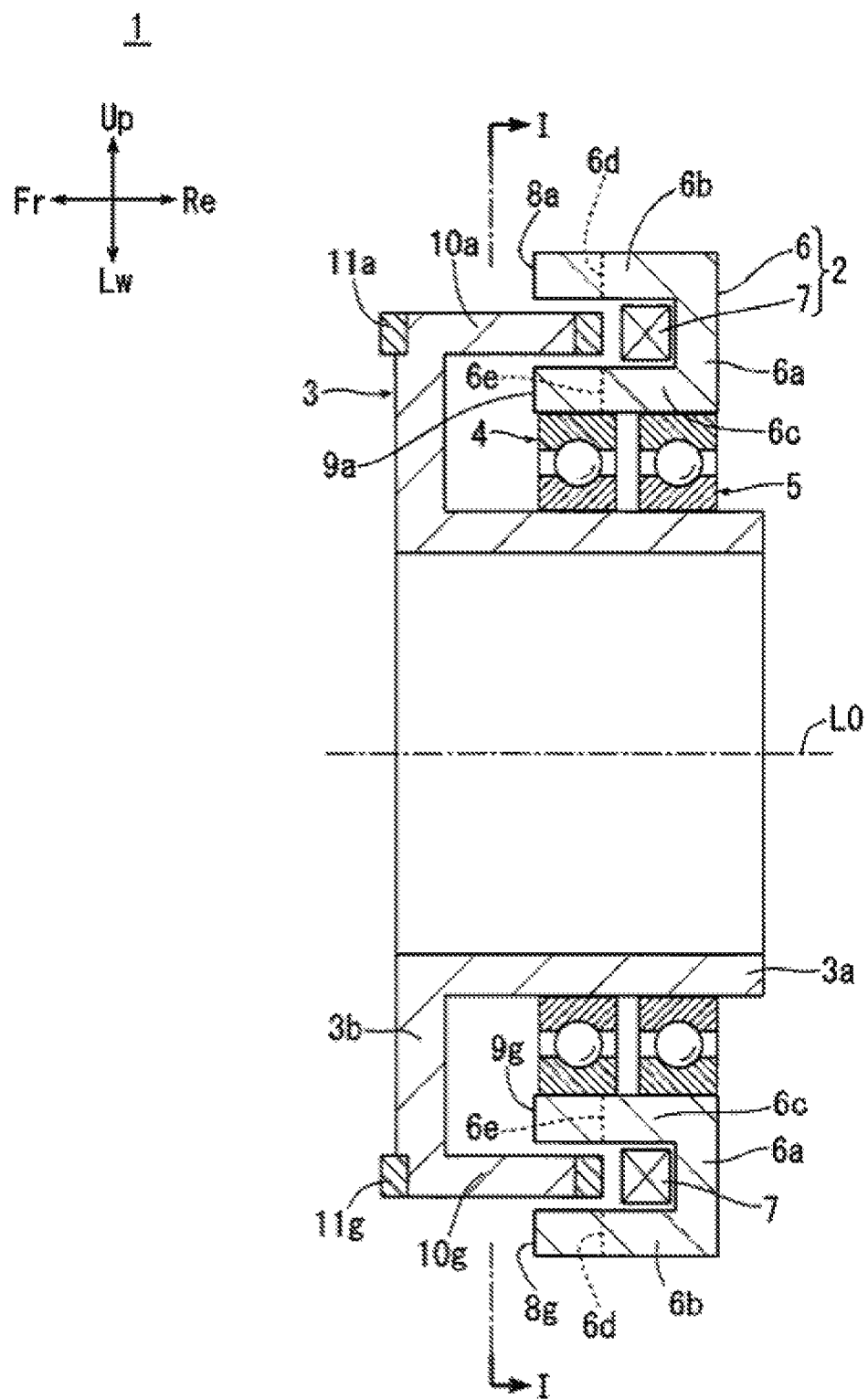
FIG. 2 is a vertical sectional view taken along an axis which is the center of rotation of the rotor in the hollow single-phase induction motor of the embodiment shown in FIG. 1.

Referring to FIGS. 1 and 2, hollow single-phase induction motor 1 in accordance with one embodiment might, for example, be made up of electrically conductive metal stator 2, rotor 3, and ball bearings 4, 5. Rotor 3 may be held by ball bearings 4, 5 so as to be capable of rotation and so as to be coaxial (i.e., along central axis L0) with respect to stator 2. Stator 2 and rotor 3 in accordance with the embodiment shown in FIGS. 1 and 2 will now be described.

In the embodiment shown in FIGS. 1 and 2, stator 2 is formed from case 6 and winding(s) 7. In accordance with this embodiment, case 6 might, for example, be made up of base 6a, annular outer circumferential wall 6b which protrudes in a perpendicular direction from the outer rim of base 6a, annular inner circumferential wall 6c which protrudes from the inner rim of base 6a so as to be located toward the interior from outer circumferential wall 6b and coaxial (i.e., along central axis L0) with respect to outer circumferential wall 6b, a plurality of first extensions 8a through 8L, and a plurality of second extensions 9a through 9L.

Figure 3:
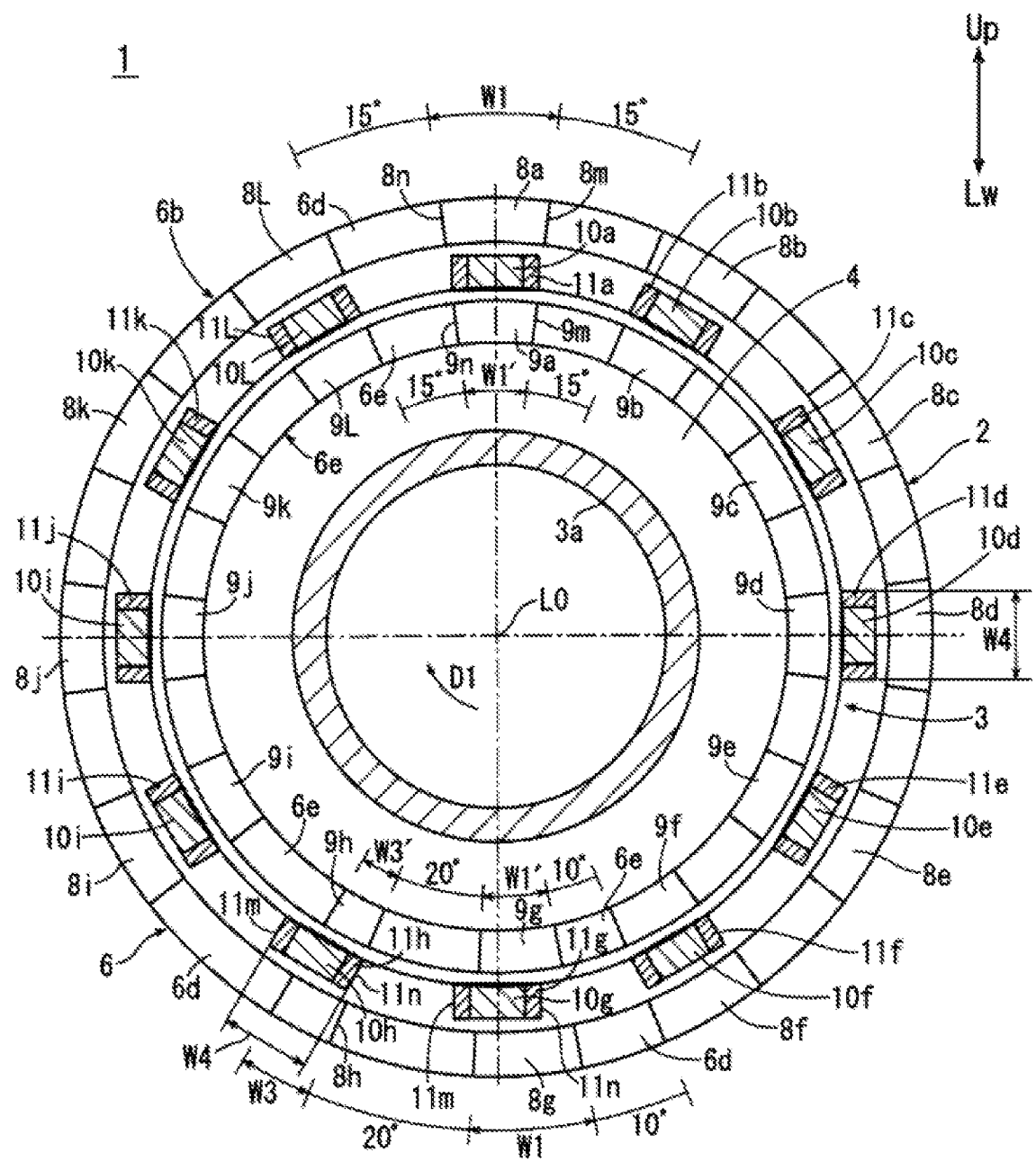
FIG. 3 is a sectional view of section I-I in FIG. 2.

Referring now to FIG. 3, the plurality of first extensions 8a through 8L might respectively protrude in parallel fashion with respect to central axis L0 from rim 6d of outer circumferential wall 6b. This plurality of first extensions 8a through 8L might, for example, be twelve extensions formed at spaced intervals along the circumferential direction of rim 6d.

Furthermore, the plurality of second extensions 9a through 9L might respectively protrude in parallel fashion with respect to central axis L0 from rim 6e of inner circumferential wall 6c. This plurality of second extensions 9a through 9L might, for example, be twelve extensions formed at spaced intervals along the circumferential direction of rim 6e.

In accordance with the present embodiment, the plurality of second extensions 9a through 9L shown in FIG. 3 might be provided in such fashion as to respectively face the plurality of first extensions 8a through 8L. The two ends 8m, 8n of each of the plurality of first extensions 8a through 8L might respectively be formed so as to be coplanar with the two ends 9m, 9n of each of the plurality of second extensions 9a through 9L faced thereby along directions radially emanating from central axis L0.

With continued reference to FIG. 3, at rim 6d of outer circumferential wall 6b, first extensions 8a through 8g and first extensions 8i through 8L might be formed so that all are of uniform circumferential length W1, where circumferential length W1 is defined as the length of the arc at the outside circumferential surface of each respective first extension. Furthermore, first extensions 8a through 8f and first extensions 8i through 8L might respectively be arranged so as to have a uniform spacing of 15° therebetween. Furthermore, second extensions 9a through 9f and second extensions 9i through 9L might be formed so that all are of uniform circumferential length W1', where circumferential length W1' is defined as the length of the arc at the inside circumferential surface of each respective second extension. Furthermore, second extensions 9a through 9f and second extensions 9i through 9L might all be arranged so as to have a uniform spacing of 15° therebetween.

Furthermore, first extension 8g at rim 6d shown in FIG. 3 might be formed so as to be spaced 10° from first extension 8f and so as be spaced 20° from first extension 8h. Furthermore, second extension 9g at rim 6e might be formed so as to be spaced 10° from second extension 9f and so as be spaced 20° from second extension 9h. That is, first extension 8g and second extension 9g might be formed with spacings different from the spacing (15°) provided at the other first extensions and second extensions.

Moreover, first extension 8h at rim 6d shown in FIG. 3 might be formed so that the circumferential length W3 thereof, where circumferential length W3 is defined as the length of the arc at the outside circumferential surface of first extension 8h, is less than circumferential length W1 at the other first extensions 8a through 8g and first extensions 8i through 8L, and second extension 9h at rim 6e might be formed so that the circumferential length W3' thereof, where circumferential length W3' is defined as the length of the arc at the outside circumferential surface of second extension 9h, is less than circumferential length W1' at the other second extensions 9a through 9g and second extensions 9i through 9L.

In accordance with the present embodiment, winding(s) 7 are provided on base 6a, mutually different magnetic poles being produced in alternating fashion at first extensions 8a through 8L and at second extensions 9a through 9L, which are respectively faced thereby, when single-phase alternating electric current is made to flow therethrough.

Furthermore, in the embodiment shown in FIGS. 1 through 3, rotor 3 might be formed from hollow cylindrical main body 3a, flange 3b, plurality of coil supports 10a through 10L, and plurality of rotor coils 11a through 11L. Main body 3a, flange 3b, and plurality of coil supports 10a through 10L might respectively be formed from resin and/or metal of low electrical conductivity, and plurality of rotor coils 11a through 11L might be formed from metal of high electrical conductivity. Flange 3b might, for example, be disk-like in shape, and be formed so as to protrude toward the exterior in the radial direction from the outside circumferential surface at the front end of main body 3a. Furthermore, plurality of coil supports 10a through 10L might respectively be in the shape of more or less identical rectangular parallelepipeds, and might be formed so as to protrude toward the rear in parallel fashion with respect to central axis L0 from outside circumferential end 3c of flange 3b. Furthermore, plurality of coil supports 10a through 10L might be arranged at, for example, twelve locations along the circumferential direction of flange 3b in such fashion that there is a uniform spacing of 30° therebetween. Rotor 3 might be rotatably and coaxially installed at a location toward the interior from inner circumferential wall 6c of case 6 by way of ball bearings 4, 5 installed at the outside circumferential surface of main body 3a.

Furthermore, plurality of rotor coils 11a through 11L shown in FIGS. 1 through 3 might be twelve members made of copper which are respectively in the shape of more or less identical rectangular parallelepiped cylinders and which are respectively secured to the outside circumferential surfaces of plurality of coil supports 10a through 10L. The four corners of each of the rotor coils 11a through 11L might be formed so as to be rounded. Note that so long as it is a metal of high electrical conductivity, the material from which the rotor coils are made is not limited to copper.

In accordance with the embodiment shown at FIG. 3, lengths of inside circumferential surfaces of first extensions 8a through 8L other than first extension 8h at case 6, and lengths of outside circumferential surfaces of second extensions 9a through 9L other than second extension 9h, might be formed so as to be more or less identical to width W4, i.e., width as viewed in a section perpendicular to central axis L0, of each of the respective rotor coils 11a through 11L.

Moreover, in the embodiment shown in FIG. 3, whereas more or less identically shaped rotor coils 11a through 11L of rotor 3 are provided with uniform spacing in the circumferential direction, first extension and second extension 8g, 9g at case 6 are formed with spacings different from the spacing at the other first extensions and second extensions. Accordingly, when rotor 3 is stopped, the ends 11m, 11n in the circumferential direction of at least one (e.g., rotor coil 11g in the example shown at FIG. 3) of the rotor coils 11a through 11L will necessarily stop at location(s) misaligned in the circumferential direction relative to the ends in the circumferential direction of both the first extension and the second extension (8g, 9g).

Furthermore, circumferential length W3 of first extension 8h is less than circumferential length W1 of the other first extensions, and circumferential length W3' of second extension 9h is less than circumferential length W1' of the other second extensions. Accordingly, the length of the outside circumferential surface of second extension 9h and the length of the inside circumferential surface of first extension 8h at case 6 are such that, when rotor 3 is stopped, the ends 11m, 11n in the circumferential direction of at least one (e.g., rotor coil 11h in the example shown at FIG. 3) of the rotor coils 11a through 11L will necessarily stop at location(s) misaligned in the circumferential direction relative to the ends in the circumferential direction of both the first extension and the second extension 8h, 9h.

As a result, in accordance with the present embodiment, an induced electric current for causing rotor 3 to start moving under its own power will necessarily be produced at rotor coil(s) acted on by magnetic force from magnetic poles produced at first and second extensions 8g, 9g and at first and second extensions 8h, 9h when single-phase electric current is made to flow therethrough.

Note that whereas rotor coils 11a through 11L of the present embodiment were provided with uniform spacing therebetween while a portion of the first extensions 8a through 8L and a portion of the second extensions 9a through 9L were provided with different spacing(s), a hollow single-phase induction motor in accordance with another embodiment may be such that a portion of the rotor coils 11a through 11L are provided with different spacing(s) while all of the first extensions 8a through 8L and all of the second extensions 9a through 9L are respectively provided with uniform spacing therebetween.

Furthermore, whereas in accordance with the present embodiment example widths of rotor coils 11a through 11L were the same while circumferential length(s) of a portion of the first extensions 8a through 8L and a portion of the second extensions 9a through 9L were formed so as to be less than circumferential length(s) of other(s), a hollow single-phase induction motor in accordance with another embodiment may be such that the circumferential lengths of all of the first extensions 8a through 8L and all of the second extensions 9a through 9L are formed so as to be the same while width(s) of some portion of the rotor coils 11a through 11L are formed so as to be greater than the respective circumferential lengths of the first extensions 8a through 8L and second extensions 9a through 9L.

Next, referring to FIGS. 1 through 4, operation of the hollow single-phase induction motor of the present embodiment will be described.

Figure 4:
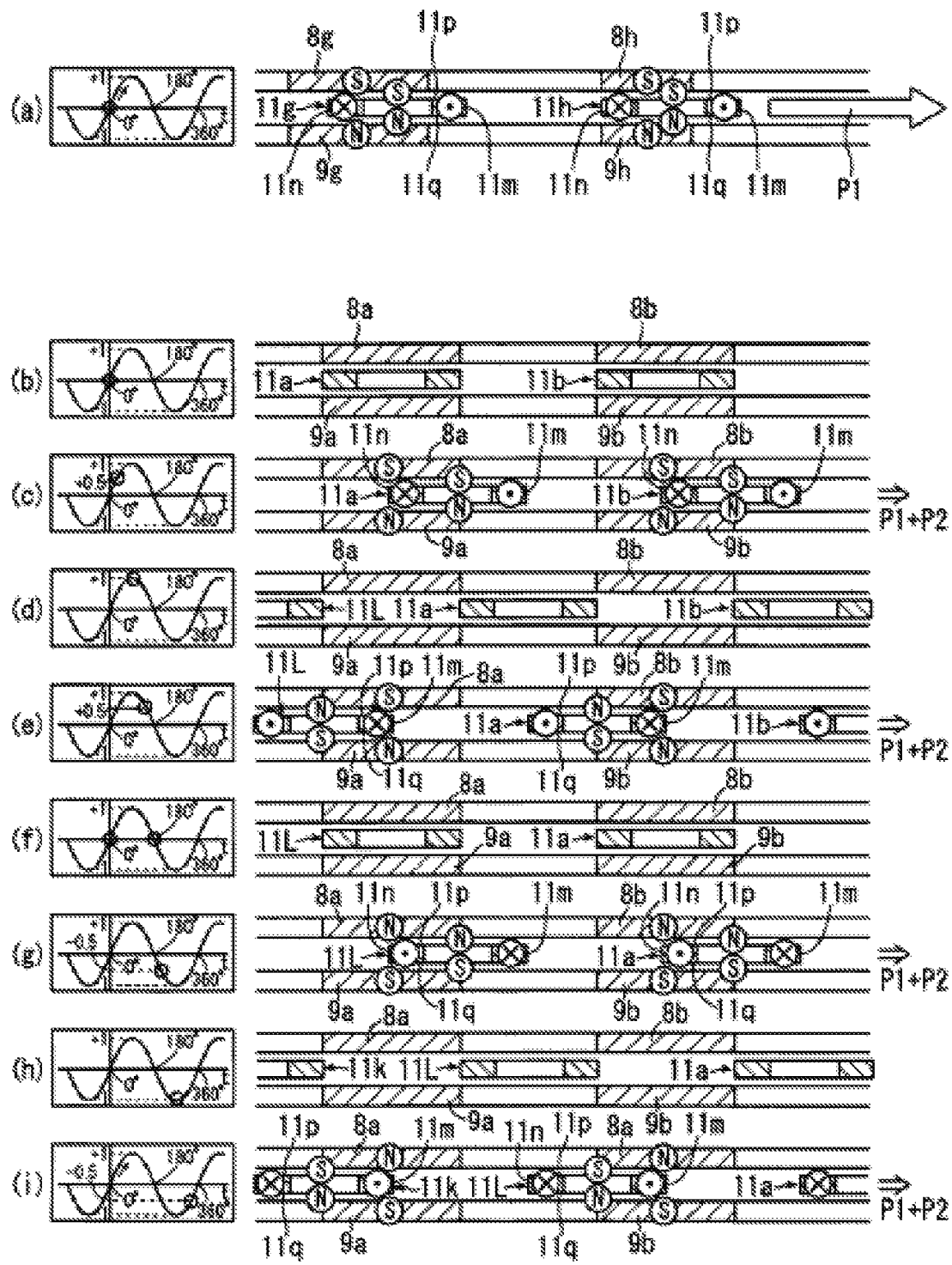
FIG. 4 is a drawing for describing operation of a hollow single-phase induction motor, (a) at FIG. 4 depicting the hollow single-phase induction motor of the embodiment of FIG. 3 as if it were unwrapped and redrawn in linear fashion in order from the starter unit which is shown at left, and (b) through (i) at FIG. 4 showing the change in electromagnetic force that occurs with passage of time, the hollow single-phase induction motor of the embodiment of FIG. 3 being depicted as if it were unwrapped and redrawn in linear fashion in order from locations other than the starter unit which are shown at left.

FIG. 4 is a drawing for describing exemplary operation of a hollow single-phase induction motor in accordance with the present embodiment. Shown at right at (a) in FIG. 4, first and second extensions 8g, 9g; first and second extensions 8h, 9h; and rotor coils 11g, 11h—which correspond to the starter unit of hollow single-phase induction motor 1 in the embodiment shown in FIG. 3—are depicted as if they were unwrapped and redrawn in linear fashion in order from the left. Furthermore, at right at (b) through (i) in FIG. 4, the change in the electromagnetic force acting on the rotor coils that occurs with passage of time is shown, first extensions 8a, 8b; second extensions 9a, 9b; and rotor coils 11a, 11b at locations other than the starter unit of the hollow single-phase induction motor in the embodiment shown in FIG. 3 being depicted as if they were unwrapped and redrawn in linear fashion in order from the left.

Moreover, with respect to the symbols appearing at right at (a) through (i) in FIG. 4, "S" and "N" indicate magnetic polarity, "x" indicates that direction of flow of electric current induced at the rotor coil is from the viewer to the plane of the paper at FIG. 4, and "·" indicates that direction of flow of electric current induced at the rotor coil is from the plane of the paper at FIG. 4 to the viewer. Furthermore, the graphs shown at left at (a) through (i) in FIG. 4 respectively indicate the change in single-phase alternating electric current flowing through mutually facing windings 7, the horizontal axis indicating time, and the vertical axis indicating intensity of electric current.

In accordance with one embodiment, sinusoidally changing single-phase alternating electric current such as is shown in the graphs at left at (a) and (b) in FIG. 4 might, for example, be made to flow through winding(s) 7 at FIG. 2. From an initial state in which no electric current flows therethrough, when electric current begins to flow in the positive direction through the winding(s), S magnetic poles are respectively produced at first extensions 8a through 8L at case 6 in FIG. 3, and N magnetic poles are respectively produced at second extensions 9a through 9L, causing increase in the magnetic flux which passes through rotor coils 11a through 11L. At this time, as shown at (a) and (c) at FIG. 4, an induced electric current is produced at rotor coils 11a through 11L, producing S poles at outer surfaces 11p of rotor coils 11a through 11L and producing N poles at inner surfaces 11q, in such fashion as to impede the increase in magnetic flux in accordance with Lentz's Law.

At this time, as shown at right at (a) in FIG. 4, because only one 11n, 11n of the two ends in the circumferential direction at each of rotor coils 11g, 11h are arranged between first extensions 8g, 8h and second extensions 9g, 9h, starting torque P1 (starting torque here and below being taken to be in clockwise direction D1 about central axis L0 at FIG. 3), which in accordance with Fleming's left hand rule is directed toward the right in the plane of the paper is produced at rotor coils 11g, 11h as a result of the induced electric current which flows from the viewer to the plane of the paper at FIG. 3 and the magnetic field which is directed from first extensions 8a through 8L to second extensions 9g, 9h. As a result, starting torque P1 produced by the single-phase alternating electric current flowing through winding(s) 7 causes rotor 3 shown in FIGS. 1 through 3 to begin to rotate under its own power relative to stator 2.

Furthermore, as shown at left at (b) in FIG. 4, when no electric current is flowing through winding(s) 7, no induced electric current is produced at rotor coils 11a, 11b at right in same drawing or at rotor coils 11c through 11f and 11i through 11L shown in FIG. 3. Furthermore, as shown at (b) in FIG. 4, even if electric current begins to flow through winding(s) 7 when the two ends in the circumferential direction of each of rotor coils 11a, 11b are arranged so as to respectively be coplanar with the two ends in the circumferential direction of each of first extensions 8a, 8b and second extensions 9a, 9b, causing magnetic poles to be produced due to the induced electric current at rotor coils 11a, 11b, because of the balance between the forces (torques) acting in the circumferential direction, no torque tending to cause rotation relative to case 6 will be produced at rotor coils 11c through 11f and 11i through 11L at FIG. 3 or at rotor coils 11a, 11b.

On the other hand, rotor coils 11a through 11f and 11i through 11L shown in FIG. 3 are made to rotate relative to case 6 due to starting torque P1 in clockwise direction D1 which is produced by rotor coils 11g, 11h. At this time, because one 11m, 11m of the ends in the circumferential direction at each of rotor coils 11c through 11f and 11i through 11L shown in FIG. 3 and rotor coils 11a, 11b shown at (c) in FIG. 4 are arranged at locations misaligned in the circumferential direction from locations between first and second extensions, when only the other 11n, 11n of the ends in the circumferential direction are arranged toward the interior from first extensions and second extensions, torque P2 tending to cause rotation in the clockwise direction in accordance with Fleming's left hand rule and electromagnetic induction is produced at rotor coils 11a through 11L. As a result, rotor coils 11c through 11f and 11i through 11L at FIG. 3 and rotor coils 11a, 11b at (c) in FIG. 4 are acted on by forces (rotational torques) P1+P2 directed toward the right in the plane of the paper, and rotor 3 shown in FIGS. 1 through 3 rotates relative to stator 2 due to rotational torques P1+P2.

Furthermore, as shown at left at (d) in FIG. 4, when the single-phase alternating electric current flowing through winding(s) 7 reaches a peak in the positive direction, because there is no longer a changing magnetic flux at the magnetic poles produced at first extensions 8a, 8b and second extensions 9a, 9b shown at right at (d) in FIG. 4, the induced electric power at rotor coils 11a, 11b, 11L momentarily stops being produced, and rotor coils 11a through 11L rotate further in direction D1 at FIG. 3 due to inertia despite the reduction in magnetic flux passing therethrough.

As shown at (e) in FIG. 4, when only one 11m of the ends in the circumferential direction at each of rotor coils 11L, 11a move to locations between adjacent first extensions 8a, 8b and second extensions 9a, 9b at a time when the magnetic flux passing therethrough is reduced, the induced electric current at rotor coils 11b through 11f and 11i through 11k at FIG. 3 and rotor coils 11L, 11a causes S poles to be produced at inner surfaces 11q and causes N poles to be produced at outer surfaces 11p in such fashion as to tend to increase magnetic flux. At such time, torque P2 tending to cause rotation in the clockwise direction in accordance with Fleming's left hand rule and electromagnetic induction is produced at rotor coils 11b through 11f and 11i through 11k at FIG. 3 and rotor coils 11L, 11a, and rotor 3 shown in FIGS. 1 through 3 continues to rotate in direction D1 relative to stator 2 due to rotational torques P1+P2.

Furthermore, as shown at left at (f) in FIG. 4, when the value of the single-phase alternating electric current flowing through winding(s) 7 returns to approximately zero, because the magnetic flux that had been produced at first extensions 8a, 8b and second extensions 9a, 9b stops changing (becomes zero), the induced electric current at rotor coils 11L, 11a momentarily stops being produced, and rotor coils 11a through 11L rotate further in direction D1 at FIG. 3 due to inertia despite the reduction in magnetic flux flowing from inner surfaces 11q toward outer surfaces 11p.

When electric current begins to flow in the negative direction through winding(s) 7 at FIG. 2 as shown at left at (g) in FIG. 4 when only one 11m of the ends in the circumferential direction at each of rotor coils 11L, 11a move to locations misaligned in the circumferential direction from locations between first extensions 8a, 8b and second extensions 9a, 9b at a time when the magnetic flux passing therethrough is reduced as shown at right at (g) in FIG. 4, the magnetic poles produced at the first and second extensions reverse polarity, such that S magnetic poles are produced at second extensions 9a through 9L and N magnetic poles are produced at first extensions (8a through 8L as shown at FIG. 3 and at right at (g) in FIG. 4. At this time, at rotor coils 11b through 11f and 11i through 11k at FIG. 3 and rotor coils 11L, 11a, the induced electric current which is produced causes N poles to be produced at outer surfaces 11p and S poles to be produced at inner surfaces 11q in such fashion as to impede the increase in magnetic flux flowing from outer surfaces 11p toward inner surfaces 11q. At such time, torque P2 tending to cause rotation in clockwise direction D1 in accordance with Fleming's left hand rule and electromagnetic induction is produced at rotor coils 11b through 11f and 11i through 11k at FIG. 3 and rotor coils 11L, 11a, and rotor 3 shown in FIGS. 1 through 3 continues to rotate in direction D1 relative to stator 2 due to rotational torques P1+P2.

Furthermore, as shown at left at (h) in FIG. 4, when the single-phase alternating electric current flowing through winding(s) 7 reaches a peak in the negative direction, because there is no longer a changing magnetic flux at the magnetic poles produced at first extensions 8a, 8b and second extensions 9a, 9b shown at right at (f) in FIG. 4, the induced electric power at rotor coils 11k, 11L, 11a momentarily stops being produced, and rotor coils 11a through 11L rotate further in direction D1 at FIG. 3 due to inertia despite the reduction in magnetic flux passing therethrough.

Furthermore, as shown at (i) in FIG. 4, when only one 11m of the ends in the circumferential direction at each of rotor coils 11k, 11L move to locations between adjacent first extensions 8a, 8b and second extensions 9a, 9b at a time when the magnetic flux passing therethrough is reduced, the induced electric current at rotor coils 11a through 11f and 11i through 11j at FIG. 3 and rotor coils 11k, 11L causes N poles to be produced at inner surfaces 11q and causes S poles to be produced at outer surfaces 11p in such fashion as to tend to increase magnetic flux. At such time, torque P2 tending to cause rotation in the clockwise direction in accordance with Fleming's left hand rule and electromagnetic induction is produced at rotor coils 11a through 11f and 11i through 11j at FIG. 3 and rotor coils 11k, 11L, and rotor 3 shown in FIGS. 1 through 3 continues to rotate in direction D1 relative to stator 2 due to rotational torques P1+P2.

In this way, not only is rotor 3 at FIG. 3 capable of starting under its own power when single-phase alternating electric current is made to flow through winding(s) 7 due to first extensions 8g, 8h and second extensions 9g, 9h making up the starter unit, but it also rotates relative to stator 2 due to rotational torque(s) in accordance with Fleming's left hand rule and induced electric current produced at rotor coils 11a through 11L as well as changes in magnetic flux and changes in magnetic pole(s) produced between first extensions 8a through 8L and second extensions 9a through 9L of stator 2. Because the magnetic field, being produced between second extensions 9a through 9L and first extensions 8a through 8L which are arranged in ring-like fashion, does not pass through the center of rotation of the motor, the single-phase induction motor of the present embodiment is capable of possessing a hollow structure, making it possible for another mechanism or the like to be arranged at the interior of the motor. Furthermore, because rotor coils 11a through 11L respectively form ring-like electrically conductive paths that are extremely short, resistance of the electrically conductive paths is low. Accordingly, the hollow single-phase induction motor of the present embodiment is capable of being made to start and rotate with little electric current.

Although the foregoing embodiment was described in terms of an example in which the misalignment described above was achieved through use of uniformly spaced rotor coils of uniform circumferential length in combination with Although the foregoing embodiment was described in terms of an example in which there were twelve rotor coils and coil supports, and twelve extensions in each of the two sets of, i.e., the first and second, stator extensions, any appropriate number thereof may be employed. For example, in some embodiments as few as three rotor coils, coil supports, first stator extensions, and second stator extensions may be employed. There is no maximum number of rotor coils, coil supports, first stator extensions, and second stator extensions that may be employed, it being possible, for example, to employ twenty-four, thirty-six, forty-eight, or any other suitable number of rotor coils, coil supports, first stator extensions, and second stator extensions.

As was the case in the foregoing embodiment, spacing of rotor coils, coil supports, first stator extensions, and second stator extensions is preferably such that, assuming that in the nonmisaligned portion these are arranged in spaced fashion about the 360° circumference such that spaces between rotor coils or stator extensions in the ring-like arrangements thereof are of approximately equal angular size as the coils or extensions themselves, the angular circumferential length allotted to each coil, coil support, first stator extension, and second stator extension, and to the spaces therebetween will in the nonmisaligned portion thereof be on the order of 360° divided by two times the number of rotor coils or the like in each ring-like arrangement thereof, this being, for example, 360°/24=15° in the foregoing embodiment in which there were twelve rotor coils and so forth in ring-like arrangements, and this would be 360°/6=60° in an embodiment in which there are, for example, three rotor coils and so forth in ring-like arrangements, and would be 360°/48=7.5° in an embodiment in which there are, for example, twenty-four rotor coils and so forth in ring-like arrangements. Similar calculations can likewise be performed for embodiments in which there are thirty-six, forty-eight, or any other suitable number of rotor coils, coil supports, first stator extensions, and second stator extensions.

Although the present invention was described in terms of an example in which the amount of the misalignment in the misaligned portion was one-third of the angular circumferential length allotted to each coil, coil support, first stator extension, and second stator extension, i.e., 5° in the foregoing embodiment, at least some advantages of the present invention, e.g., ability of a single-phase induction motor to start under its own power, can be achieved where the amount of misalignment in the misaligned portion is, for example, between one-quarter and one-half of the angular circumferential length allotted to each coil, coil support, first stator extension, and second stator extension. For example, this would correspond to a misalignment of 3.75° to 7.5° in an embodiment such as the foregoing embodiment in which there were twelve rotor coils and so forth in ring-like arrangements, this would correspond to a misalignment of 15° to 30° in an embodiment in which there are, for example, three rotor coils and so forth in ring-like arrangements, and this would correspond to a misalignment of 1.875° to 3.75° in an embodiment in which there are, for example, twenty-four rotor coils and so forth in ring-like arrangements. Similar calculations can likewise be performed for embodiments in which there are thirty-six, forty-eight, or any other suitable number of rotor coils, coil supports, first stator extensions, and second stator extensions.

Although the present invention was described in terms of an example in which equal angular circumferential length was allotted to each coil, coil support, first stator extension, and second stator extension, and to the spaces therebetween, the present invention is not limited thereto, there being no particular objection to embodiments in which the angular circumferential length allotted to each coil, coil support, first stator extension, and second stator extension is greater than or is less than the spaces therebetween, for example.

EXPLANATION OF REFERENCE NUMERALS

1 Hollow single-phase induction motor
2 Stator
3 Rotor
6 Case
6a Base
6b Outer circumferential wall
6c Inner circumferential wall
6d Outer circumferential wall rim
6e Inner circumferential wall rim
7 Winding(s)
8a through 8L Plurality of first extensions
8h First extension arranged with different spacing in circumferential direction at outer circumferential wall
8g First extension formed so as to be shorter than other first extensions
9a through 9L Plurality of second extensions
9h Second extension arranged with different spacing in circumferential direction at inner circumferential wall
9g Second extension formed so as to be shorter than other second extensions
10a through 10L Coil supports
11a through 11L Plurality of rotor coils
L0 Axis which is center of rotation of rotor

What is claimed is:

1. In the context of an induction motor having a stator made of metal causing a plurality of magnetic poles to be formed through use of an alternating current power source, and a rotor which is arranged coaxially with respect to the stator and which rotates relative to the stator in accordance with changes in the magnetic poles at the stator, a hollow single-phase induction motor characterized in that the stator has an annular case having a base, an annular outer circumferential wall which protrudes in a perpendicular direction from the base, an annular inner circumferential wall which protrudes from the base so as to be located inside the outer circumferential wall and coaxial with respect to the outer circumferential wall, a plurality of first extensions formed at spaced intervals along a circumferential direction of a tip edge of the outer circumferential wall, and a plurality of second extensions formed at spaced intervals along the circumferential direction of a tip edge of the inner circumferential wall in such fashion as to respectively face the first extensions; and a winding which is secured to an inside of the case and which forms mutually different magnetic poles at the first extensions and the second extensions when alternating single-phase electric current is made to flow therethrough; and the rotor has a cylindrical main body which is rotatably and coaxially supported by the inside of the case, a flange formed so as to protrude from an outside circumferential surface of the main body, a plurality of coil supports formed at spaced intervals along the circumferential direction of an outer rim of the flange, which are inserted in gaps formed between the first extensions and the second extensions in such fashion that the respective tips thereof are parallel to both the first extensions and the second extensions, and which are such that at least one thereamong is arranged so as to be misaligned in the circumferential direction of the case relative to both the first extensions and the second extensions, and a plurality of annular rotor coils which are respectively attached to outside circumferential surfaces of the respective coil supports.

2. The hollow single-phase induction motor according to claim 1 wherein one of either combination of the plurality of the first extensions and the second extensions that face the first extensions, or the plurality of coil supports, are arranged with uniform spacing in the circumferential direction of the case, and at least a portion of the other are arranged with a different spacing in the circumferential direction of the case.

3. The hollow single-phase induction motor according to claim 1 wherein respective lengths of inside circumferential surfaces of the plurality of first extensions and respective lengths of outside circumferential surfaces of the plurality of second extensions are all formed so as to be shorter than respective widths of the rotor coils.

4. The hollow single-phase induction motor according to claim 1 wherein the rotor coils are made of copper.

* * * * *